June 10, 1930. F. SLATHAR 1,762,671
SEED PLANTER
Original Filed May 5, 1920 4 Sheets-Sheet 1

Inventor:
Fritz Slathar, Deceased
by Marie Slathar, Executrix
BY
ATTORNEYS.

June 10, 1930. F. SLATHAR 1,762,671
SEED PLANTER
Original Filed May 5, 1920 4 Sheets-Sheet 4

Inventor:
Fritz Slathar, Deceased
by Marie Slathar, Executrix
BY
ATTORNEYS

Patented June 10, 1930

1,762,671

UNITED STATES PATENT OFFICE

FRITZ SLATHAR, DECEASED, LATE OF MINNEAPOLIS, MINNESOTA, BY MARIE SLATHAR EXECUTRIX, OF MINNEAPOLIS, MINNESOTA

SEED PLANTER

Continuation of application Serial No. 473,049, filed May 5, 1920. This application filed May 3, 1929. Serial No. 360,258.

This invention relates to machines for depositing seeds upon the ground or in a furrow and then covering the same, and the object of the invention is to provide the machine with a novel and improved seed-dispensing mechanism which operates by air suction to take the seed from a hopper and then deposit the same on the ground or in the previously prepared furrow.

The object stated is attained by means of a combination and arrangement of parts to be hereinafter described and claimed, and in order that the same may be better understood, reference is had to the accompanying drawings forming a part of this specification.

Figure 1:
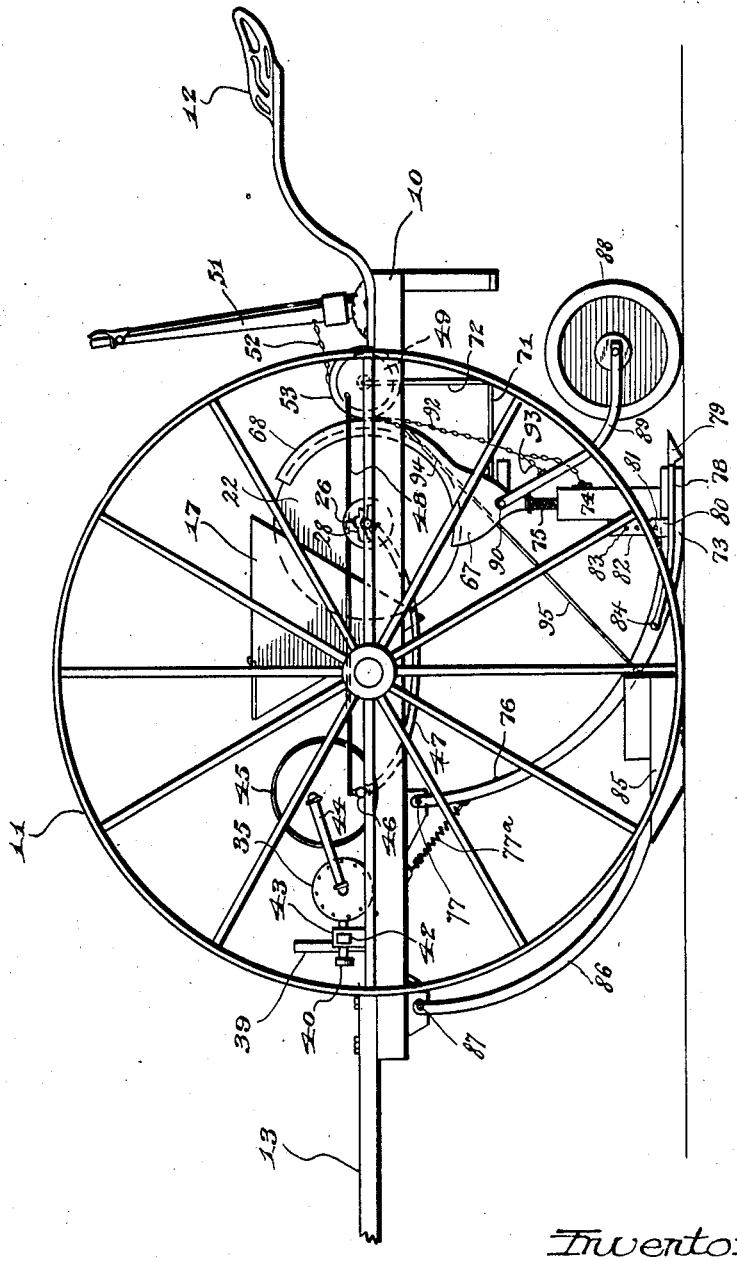
Figure 1 is a side elevation of the machine.
Figure 2:
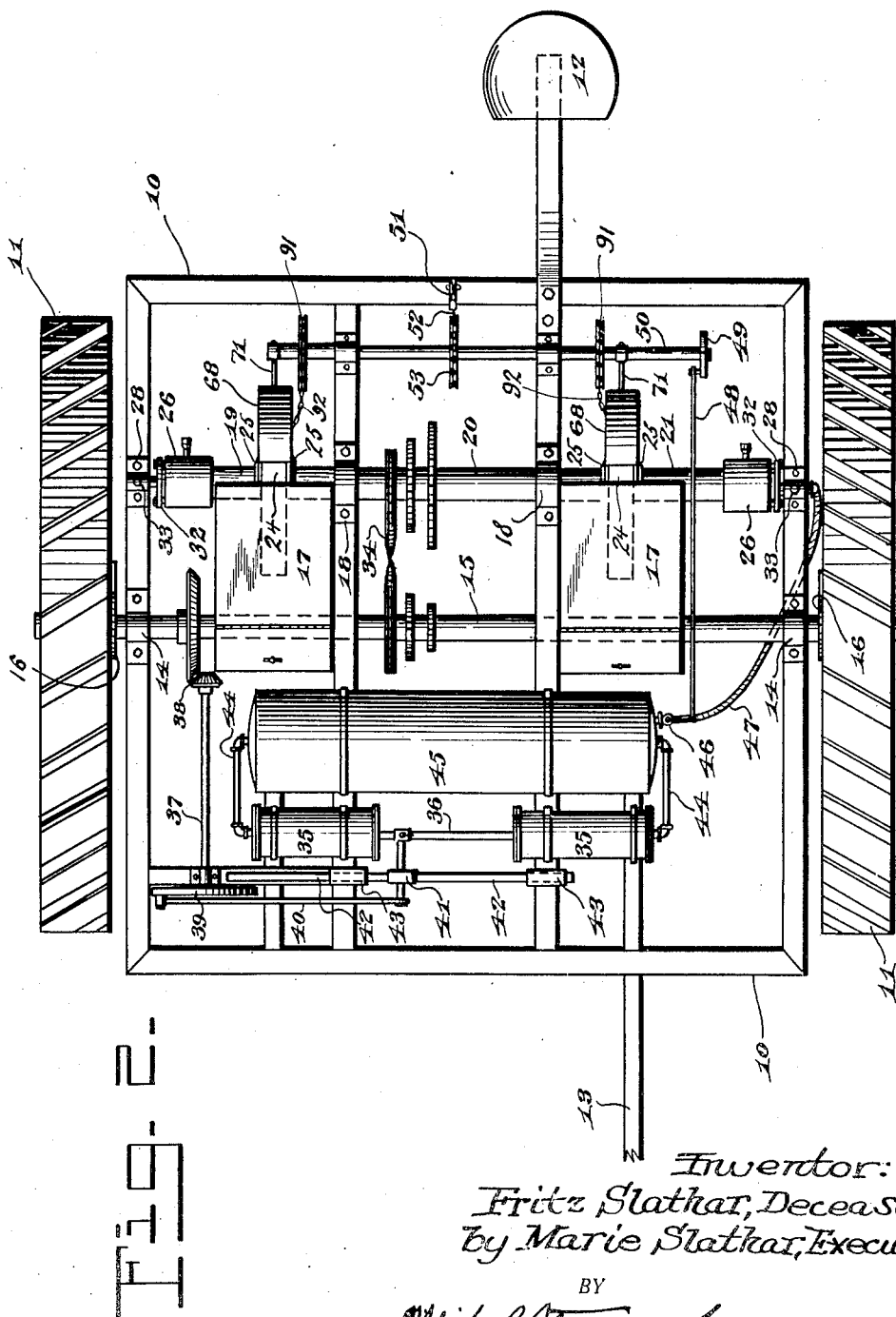
Figure 2 is a plan view thereof.
Figure 3:
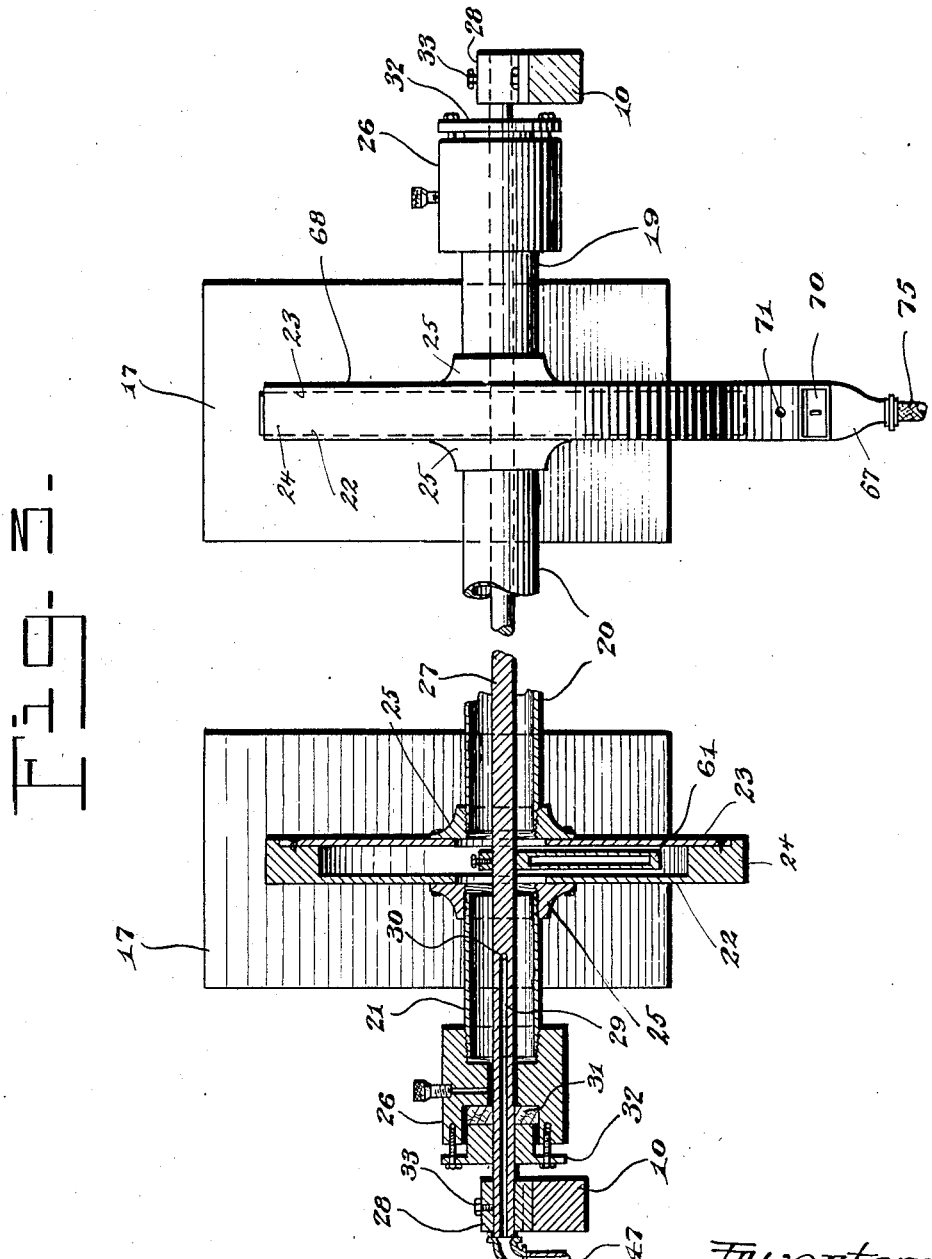
Figure 3 is a rear elevation of the seed-dispensing mechanism, partly in section.

Referring specifically to the drawings, 10 denotes a frame suitably designed and arranged to support the various elements of the machine. This frame is supported by two wheels 11, and has a seat 12 for the driver, and a tongue or pole 13 for attachment of the draft animals. It will be understood, of course, that the machine may also be power-driven or otherwise propelled. On the frame 10 are bearings 14 for an axle shaft 15 carrying the wheels 11, the latter being loose on said shaft, but having a pawl-and-ratchet or other driving connection 16 with the shaft to compensate for the unequal turning movements of the wheels when the machine is not being driven in a straight line. This connection is a well-known one, and hence need not be described.

The machine may be built to plant one or more rows, a two-row machine being illustrated in the drawing. The seed planting mechanism to be presently described is also adapted for a one-row, hand operated implement. The seed hoppers are shown at 17, they being suitably supported on the frame 10. Associated with each seed-hopper is a seed dispensing or delivery mechanism which takes the seed individually or singly from the hopper and deposits the same on the ground. As the seed dispensing devices are alike in construction and operation, a description of one suffices for both.

Back of the shaft 15, the frame 10 supports, in bearings 18, a hollow shaft assembly consisting of three alined sections 19, 20 and 21, respectively. The seed dispensing devices are carried by these shaft sections, one device being positioned between the sections 19 and 20, and the other between the sections 20 and 21. Of course, where only one dispensing device is employed two shaft sections suffice, and where more than two dispensing devices are employed, the shaft sections will be increased accordingly.

Each dispensing device is a hollow circular or disk-like member made up of two laterally spaced disks 22 and 23, respectively, the former having on its side which faces the latter, an annular flange 24 to which the disk 23 is secured by screws or other suitable fasteners. The space between the disks, inside the flange forms a suction chamber the function of which will be presently described. It is therefore important to make an air-tight joint between the parts. On the outer faces of the disks are hubs 25 into which the shaft sections 19 and 20, (or 20 and 21) are screwed so as to open into the suction chamber. Any other suitable connection between the disks and the shaft sections may be provided.

The air is exhausted from the space between the disks 22 and 23 by the following means:

The outer ends of the shaft sections 19 and 20 are coupled to caps 26 by being screwed into the inner end thereof. Through these caps extends a stationary shaft 27 supported at its end in bearings 28 on the frame. This shaft also passes through the hollow shaft sections 19, 20 and 21, as well as through the suction chamber formed by the disks 22 and 23, and a hole is drilled into one end of the stationary shaft extending inward far enough so that its inner end which opens through the side of said shaft, as shown at 30, leads into the hollow shaft section which is in communication with the aforesaid suction chamber, and hence air may be exhausted from the latter by a suction apparatus having its inlet connected to the aforesaid end of the shaft 27. When the shaft 27 enters the caps 26, the latter have a stuffing box to seat a packing 31 held compressed by a gland 32. The shaft 27 is stationary, it being so held by set screws 33 on the bearings 28, and the hollow shaft sections 19, 20 and 21, as well as the caps 26 rotate about said shaft.

The hollow shaft sections 19, 20 and 21 are driven by a sprocket-and-crossed-chain or other suitable gearing 34 from the wheel driven axle shaft 15. The shafts are provided with three sets of sprocket wheels proportioned so that the seed dispensing mechanism may be driven at different speeds.

At 35 are shown two opposite air suction pump cylinders having their pistons connected to a single rod 36 and driven from the shaft 15, said shaft being geared to a countershaft 37 by a bevel gearing 38, and said countershaft having a wrist wheel 39 which is connected by a pitman 40 to a slidable cross head 41 connected to the rod 36, said cross head having guide rods 42 working in guides 43. This suction pump assembly is suitably supported on the frame 10.

The cylinders 35 have connections 44 with a vacuum tank 45 mounted on the frame 10. On one end of tank 45 is a valve 46 connected by a flexible hose 47 to the end of shaft 27 having the suction duct 29, so that when the valve is opened, and the suction pump is in operation, air is exhausted from the suction chamber formed by the disks 22 and 23.

The valve 46 is provided with a control rod 48 connected to crank wheel 49 on a shaft 50 supported by the frame 10. The shaft 50 is operated by a hand lever 51 connected by a chain 52 fastened to a pulley 53 on said shaft.

Figure 4:
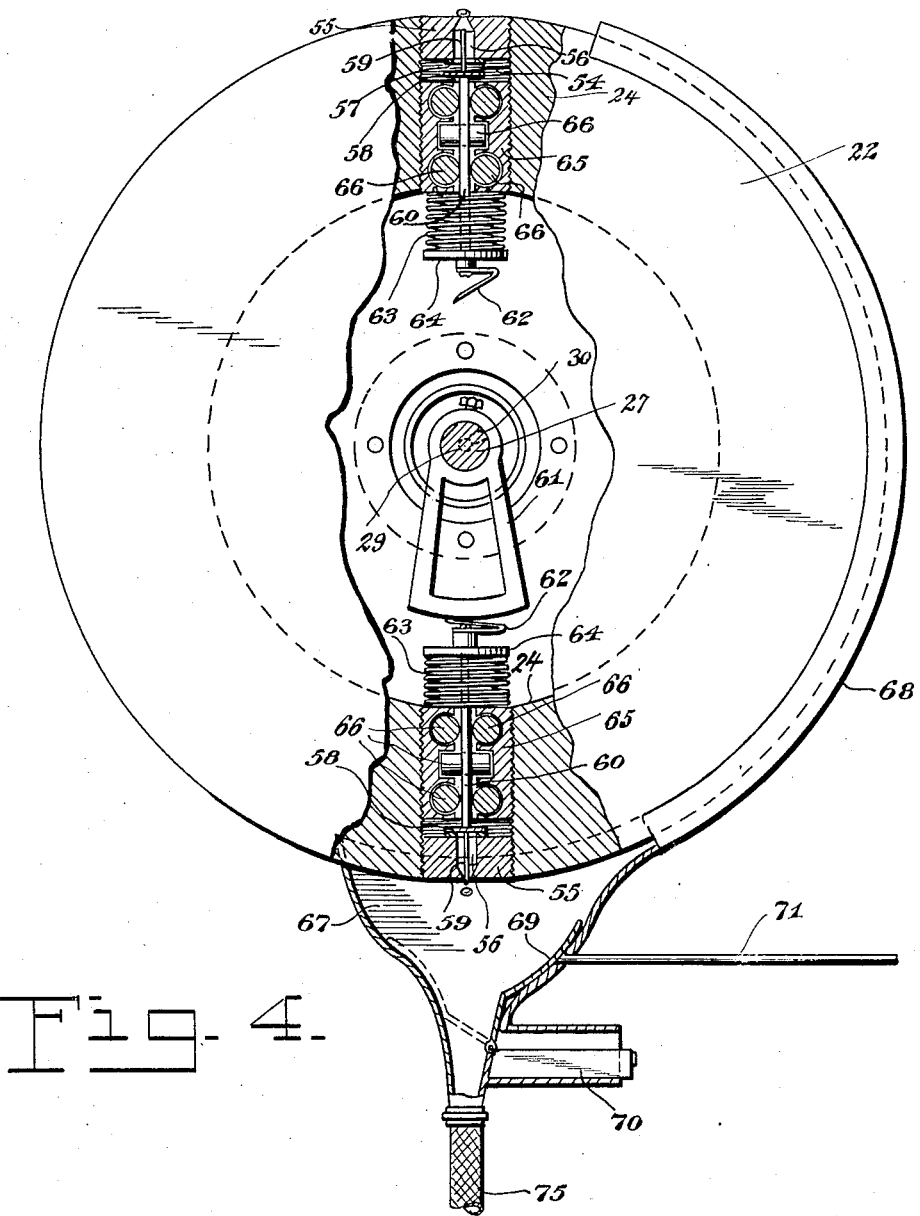
Figure 4 is a side elevation of one of the seed-dispensing units, partly in section.

At regular intervals, the rim flange 24 of the dispensing device has radial recesses 54 which are threaded to seat plugs 55. Each plug 55 is flush with the outer periphery of the flange 24 and has a central longitudinal duct 56. The plug does not occupy the entire length of the recess 54 and the duct 56 opens at its inner end into said recess, and at its outer end through the outer periphery of the flange 24. The outer end of the duct 56 is tapered and of constricted cross-sectioned area, as shown in Figure 4. The inner end of the duct 56 is encircled by a leather washer 57 forming a seat for a valve 58 which is a flat disk. From the face of the valve 58 extends a stem 59 which extends into the duct 56 sufficient distance so that when the valve is seated, the outer end of the stem reaches the outer end of the duct to dislodge seed seating on said end. From the back of the valve 58 extends a stem 60 which extends inwardly through the recess 54, back of the plug 55, and also into the suction chamber defined by the disks 22 and 23, and the flange 24. If this suction chamber operates a valve trip device in the form of a cam 61 which is stationary by being fastened on the shaft 27. The inner end on the valve stem 60 is fitted with a bowed spring 72 into the path on which the cam 61 extends. The valve 58 is closed when the spring 62 wipes across the cam 61, and when the spring leaves the cam, the valve is opened by a spring 63 coiled around the stem 60 between an abutment 64 thereon and the inner end of a plug 65 seating in the recess 54 back of the plug 55. The plugs 55 and 65 are spaced to accommodate the valve 58. The valve 58 is held normally open or off its seat 57 by the spring 63, to leave the duct 56 open, and when the valve is seated said duct is closed at its inner end. The spring 62 provides a yielding actuating connection between the cam 61 and the valve stem 60 to prevent the valve 58 from being forced too tightly to its seat 57.

The valve stem 60 is squared and it is guided and prevented from turning by rollers 66 engaging each of its sides. These rollers are suitably supported in recesses in the plug 65, these recesses being arranged to leave a passageway along the valve stem 60, and hence when the valve 58 is off its seat 57 the flange 24 is in open communication with the duct 56. It will therefore be seen that a seed seating over the outer end of the duct 56 is held firmly in place thereon until the suction is broken which takes place when the seed arrives opposite a seed chute 67 to be presently described, the cam 61 being positioned to close the valve 58 when the seed comes above this chute. The seating of the valve 58 closes the inner end of the duct 56, and as the seed is now no longer subjected to suction, it drops, now advances and pushes valves 58 closed. The seed hopper 17 has an end slot and the seed dispensing device is positioned to partly extend into this slot, as shown in Figure 1. It will be understood that the valve 58 is open when the device is passing through the seed hopper, and hence the suction at the outer end of the duct 56 attracts a seed to said end, and the seed being held here until it is dropped when it comes over the chute 67. The outer end of the duct 56 is of course, made small enough to prevent the smallest seeds from passing thereinto and clogging the valve mechanism.

Plug 55 will be provided having ducts 56 of various diameters to adapt the machine for different kinds of seeds, and they are readily removable to effect a change of plugs.

The seed receiving chute 67 has the shape of a funnel provided with an upward rear extension 68 enclosing the peripheral portion of the seed dispensing device where the same is traveling downward to discharge position. This extension serves as a guard to prevent loss of seeds when the suction is cut off by closing the valve 46, this being down when the machine arrives at the end of a row in the field. In the chute 67 is a pivoted seed deflector gate 69 adapted to be swung across the same to direct the seeds into a receptacle 70 carried at the rear side of the chute back of an opening therein, as shown in Figure 4. During the normal operation of the machine the gate 69 is swung back to seat against the rear wall of the chute 67 so as not to interfere with the dropping of the seed, but when the suction is shut off, the gate is swung across the chute as shown in Figure 4 so that the seeds dropping off will slide down the guard 68 and upon reaching the gate they slide down the same into the receptacle 70 which can be drawn out and emptied when full. The mechanism therefore effectually prevents waste of seeds. When the gate 69 is swung back to leave the chute 67 clear, it extends across the inner end of the receptacle 70 to cut off the same from the chute.

To the gate 69 is connected an operating rod 71 which extends rearwardly and has its rear end connected to a crank arm 72 fastened to the shaft 50, and hence when the latter is operated as heretofore described to close the valve 46 and cut off the suction, the gate 69 is also swung over to seed deflecting position. When the valve 46 is opened to resume the suction operation, gate 69 is swung back to leave the chute 67 unobstructed for the dropping of the seed to the ground.

Associated with each seed dispensing device is a furrow opener 73 carrying an upright seed delivery tube 74 which is connected to the bottom or outlet end of the chute 67 by a flexible conduit 75. This conduit allows the furrow opener to rise or fall according to the nature of the ground, and also directs the seeds to the tube 74 down which latter they drop to the ground. The furrow opener has a forwardly extending shank 76 which is pivoted to the frame 10, as shown at 77, with a spring 77ª connected at one end to the frame and at the other end to the shank to prevent the furrow opener from bouncing up and down when going over rough places.

On the sides of the furrow opener 73 are floats consisting of outstanding horizontal wings 78 to the rear ends of which back of the furrow opener are fastened coverer blades 78 which serve to regulate the depth the furrow opener penetrates the ground, as they ride over the surface of the ground, and they are made vertically adjustable so that the depth may be varied as desired according to the kind of seed to be planted. This adjustment of the floats 78 is effected by providing the same with ears 80 connected by a cross bolt 81 may be passed to fix the height of the floats. The forward ends of the floats 78 are provided to the sides of the furrow opener as shown at 84.

In front of the furrow opener 73 runs a planker 85 to smooth down the ground. The planker is drawn by a bar 86 hinged to the frame 10, as shown at 87, to enable the planker to rise and fall when going over uneven ground.

To the rear of the coverers 79 is a packer wheel 88 the weight of which packs the sides of the covered furrow, but leaves the center of the furrow unpacked so that the seeds will have no difficulty in sprouting through the top crust of the ground, this action of the packer being obtained by making its periphery with a U-shaped circumferential recess.

The packer wheel 88 is carried by a drawn bar 89 pivoted, as shown at 90, to the side of the chute 67, the latter being rigidly carried by the frame 10.

On the shaft 50 is a grooved pulley 91 to hold one end of a chain 92 having its other end connected to the tube 74 of the furrow opener 73, with a branch 93 running to the pivoted draw bar 89 of the packer wheel 88. A second branch chain 94 is connected by a rod 95 to the planker 85. It will therefore be seen that when the hand lever 51 is swung back to rock the shaft 50, the furrow opener 73, the packer wheel 88, and the planker 85 are lifted off the ground, and simultaneous with this operation, the valve 46 is closed to cut off the suction and the gate 29 is closed in seed-deflecting position. The machine is therefore readily controlled, and it is highly efficient in operation.

Claims:

1. In a planter, a seed dispensing device having suction means for receiving and holding the seeds, and movable to seed-discharging position, means for breaking the suction when the seeds arrive at discharging position, and a seed engaging pusher device operating when the suction is broken.

2. In a planter, a seed receptacle and a rotatable seed-dispensing device positioned to pass through the receptacle, said dispensing device having a suction chamber and ducts leading therefrom through the periphery of the device, valves controlling the ducts, said valves being normally open, means for closing the valves at predetermined positions of the ducts during the travel of the device, means for exhausting air from the suction chamber, and a seed engaging pusher device movable to operative position when the aforesaid valve is closed.

3. In a planter, a seed receptacle and a rotatable seed-dispensing device positioned to pass through the receptacle, said dispensing device having a suction chamber and ducts leading therefrom through the periphery of the device, valves controlling the ducts, said valves being normally open, means for closing the valves at predetermined positions of the ducts during the travel of the device, means for exhausting air from the suction chamber, and seed engaging pusher stems carried by the aforesaid valves and movable to operative position when the valves are closed.

4. In a planter, a seed receptacle, a seed dispensing device positioned to pass through the receptacle and to pass therefrom to seed dispensing position, said device having a suction chamber and ducts leading therefrom through the periphery of the device, valves controlling the ducts, said valves being normally open, means for closing the valves when the ducts arrive at seed discharging position, means for exhausting air from the suction chamber, and a seed-engaging pusher device movable to operative position when the aforesaid valves are closed.

5. In a planter, a seed receptacle and a rotatable seed dispensing device positioned to pass through the receptacle, said dispensing device having a suction chamber and ducts leading therefrom through the periphery of the device, valves controlling the ducts, said valves being normally open, means for closing the valves at predetermined position of the ducts during the travel of the device, means for exhausting air from the suction chamber, and a seed-engaging pusher stem carried by the aforesaid valves and movable to operative position when the valves are closed.

6. In a planter, a seed dispensing device having a suction chamber and ducts leading therefrom through the periphery of the device, valves controlling the ducts, said valves being normally open, means for closing the valves, means for exhausting the air from the suction chamber, and a seed engaging pusher stem carried by the aforesaid valves and movable to operative position when the valves are closed.

7. In a planter, a seed dispensing device having a suction chamber and ducts leading therefrom through the periphery of the device, valves controlling the ducts, said valves being normally open, means for closing the valves, means for exhausting the air from the suction chamber, and a seed engaging device movable to operative position when the aforesaid valves are closed.

8. In a planter, a seed dispensing device movable from seed-receiving to seed-discharging position, and having a suction chamber and ducts leading therefrom through the periphery of the device, valves controlling the ducts, said valves being open when the device is in seed-receiving position, means for closing the valves when the device is in seed-discharging position, and a seed-engaging pusher device movable to operative position when aforesaid valves are closed.

9. In a planter, a seed dispensing device movable from seed-receiving to seed-discharging position, and having a suction chamber and ducts leading therefrom through the periphery of the device, valves controlling the ducts, said valves being open when the device is in seed-receiving position, means for closing the valves when the device is in seed-discharging position, and a seed-engaging pusher stem carried by the aforesaid valves and movable to operative position when the valves are closed.

10. In a planter, a seed-dispensing device movable from seed-receiving to seed discharging position, said device having suction ducts opening through its outer surface, means for producing suction through the ducts, valves controlling the suction through the ducts, said valves being open when the device is in seed-receiving position, means for closing the valves when the device is in seed-discharging position, and a seed-engaging pusher device movable to operative position when the aforesaid valves are closed.

11. In a planter, a seed-dispensing device movable from seed-receiving to seed-discharging position, said device having suction ducts opening through its outer surface, means for producing suction through the ducts, valves controlling the suction through the ducts, said valves being open when the device is in seed-receiving position, means for closing the valves when the device is in seed-discharging position, and a seed engaging pusher stem carried by the aforesaid valves and movable to operative position when the valves are closed.

12. In a planter, a seed receptacle, a seed dispensing device obtaining seed from the receptacle and movable therefrom to discharging position, said device having suction ducts opening through its outer surface, means for producing suction thru the ducts, valves controlling the suction through the ducts, said valves being open when the device is in seed-receiving position, means for closing the valves when the device is in seed-discharging position, and a seed-engaging pusher device movable to operative position when the aforesaid valves are closed.

13. In a planter, a seed receptacle, a seed dispensing device obtaining seed from the receptacle and movable therefrom to discharging position, said device having suction ducts opening through its outer surface, means for producing suction through the ducts, valves controlling the suction through the ducts, said valves being open when the device is in seed-receiving position, means for closing the valves when the device is in seed-discharging position, and a seed-engaging pusher stem carried by the aforesaid valves and movable to operative position when the valves are closed.

14. In a planter, a seed receptacle and a rotatable seed-dispensing device positioned to pass through the receptacle, said dispensing device having a suction chamber and ducts leading therefrom through the periphery of the device, valves controlling the ducts, said valves being normally open, means for closing the valves at predetermined positions of the ducts during the travel of the device, means for exhausting air from the suction chamber, means for shutting off the air exhausting means, a seed delivery device into which the seeds are adapted to be discharged, a gate operable to close the delivery device when the air-exhausting means is shut off, and a receptacle into which the gate deflects the seeds.

15. In a planter, a seed receptacle and a rotatable seed-dispensing device positioned to pass through the receptacle, said dispensing device having a suction chamber and ducts leading therefrom through the periphery of the device, valves controlling the ducts, said valves being normally open, means for closing the valves at predetermined positions of the ducts during the travel of the device, means for exhausting air from the suction chamber, means for shutting off the air exhausting means, a seed delivery device into which the seeds are adapted to be discharged, a gate operable to close the delivery device when the air-exhausting means is shut off, and a receptacle into which the gate deflects the seeds, and means for operating said shut-off means and the gate simultaneously.

16. In a planter, a seed receptable, a seed-dispensing device positioned to pass through the receptacle and to pass therefrom to seed discharging position, said device having a suction chamber and ducts leading therefrom through the periphery of the device, valves controlling the ducts, said valves being normally open, means for closing the valves when the ducts arrive at seed-discharging position, means for exhausting air from the suction chamber, means for shutting off the air exhausting means, a seed delivery device into which the seeds are adapted to be discharged, a gate operable to close the delivery device when the air exhausting means is shut off, and a receptacle into which the gate deflects the seeds.

17. In a planter, a seed receptacle, a seed-dispensing device positioned to pass through the receptacle and to pass therefrom to seed discharging position, said device having a suction chamber and ducts leading therefrom through the periphery of the device, valves controlling the ducts, said valves being normally open, means for closing the valves when the ducts arrive at seed-discharging position, means for exhausting air from the suction chamber, means for shutting off the air exhausting means, a seed delivery device into which the seeds are adapted to be discharged, a gate operable to close the delivery device when the air-exhausting means is shut off, and a receptacle into which the gate deflects the seeds, and means for operating said shut-off means and the gate simultaneously.

18. In a planter, a seed dispensing device having a suction chamber and ducts leading therefrom through the periphery of the device, valves controlling the ducts, said valves being normally open, means for closing the valves, means for exhausting air from the suction chamber, means for shutting off the air exhausting means, a seed delivery device into which the seeds are adapted to be discharged, a gate operable to close the delivery device when the air-exhausting means is shut off, and a receptacle into which the gate deflects the seeds.

19. In a planter, a seed dispensing device having a suction chamber and ducts leading therefrom through the periphery of the device, valves controlling the ducts, said valves being normally open, means for closing the valves, means for exhausting air from the suction chamber, means for shutting off the air exhausting means, a seed delivery device into which the seeds are adapted to be discharged, a gate operable to close the delivery device when the air exhausting means is shut off, and a receptacle into which the gate deflects the seeds, and means for operating said shut off means and the gate simultaneously.

20. In a planter, a seed-dispensing device movable from seed-receiving to seed discharging position, said device having suction ducts opening through its outer surface, means for producing suction through the ducts, valves controlling the suction through the ducts, said valves being open when the device is in seed-receiving position, means for closing the valves when the device is in seed-discharging position, means for shutting off the aforesaid suction producing means, a seed delivery device into which the seeds are adapted to be discharged, a gate operable to close the delivery device when the suction producing means is shut off and a receptacle into which the gate deflects the seeds.

21. In a planter, a seed-dispensing device movable from seed-receiving to seed discharging position, said device having suction ducts opening through its outer surface, means for producing suction through the ducts, valves controlling the suction through the ducts, said valves being open when the device is in seed-receiving position, means for closing the valves when the device is in seed-discharging position, means for shutting off the aforesaid suction producing means, a seed delivery device into which the seeds are adapted to be discharged, a gate operable to close the delivery device when the suction producing means is shut off and a receptacle into which the gate deflects the seeds, and means for operating said shut off means and the gate simultaneously.

22. In a planter, a seed receptacle, a seed-dispensing device obtaining seed from the receptacle and movable therefrom to discharging position, said device having suction ducts opening through its outer surface, means for producing suction through the ducts, valves controlling the suction through the ducts, said valves being open when the device is in seed-receiving position, means for closing the valves when the device is in seed-discharging position, means for shutting off the aforesaid suction producing means, a said delivery device into which the seeds are adapted to be discharged, a gate operable to close the delivery device when the suction producing means is shut off, and a receptacle into which the gate deflects the seeds.

23. In a planter, a seed receptacle, a seed-dispensing device obtaining seed from the receptacle and movable therefrom to discharging position, said device having suction ducts opening through its outer surface, means for producing suction through the ducts, valves controlling the suction through the ducts, said valves being open when the device is in seed-receiving position, means for closing the valves when the device is in seed-discharging position, means for shutting off the aforesaid suction producing means, a said delivery device into which the seeds are adapted to be discharged, a gate operable to close the delivery device when the suction producing means is shut off, and a receptacle into which the gate deflects the seeds, and means for operating said shut off means and the gate simultaneously.

24. In a planter, a seed receptacle and a rotatable seed dispensing device positioned to pass through the receptacle, said dispensing device having a suction chamber and ducts leading therefrom through the periphery of the device, valves controlling the ducts, said valves being normally open, a stationary cam member in the suction chamber engageable by the valves for closing the same, and means for exhausting air from the suction chamber.

25. In a planter, a seed receptacle and a rotatable seed dispensing device positioned to pass through the receptacle, said dispensing device having a suction chamber and ducts leading therefrom through the periphery of the device, valves controlling the ducts, said valves being normally open, a stationary cam member in the suction chamber, stems on the valves intercepted by the cam member for closing the valves, and means for exhausting air from the suction chamber.

26. In a planter, a seed receptacle and a rotatable seed dispensing device positioned to pass through the receptacle, said dispensing device having a suction chamber and ducts leading therefrom through the periphery of the device, valves controlling the ducts, said valves being normally open, a stationary cam member in the suction chamber, stems on the valves intercepted by the cam member for closing the valves, said stems having a resilient cam engaging part, and means for exhausting air from the suction chamber.

27. In a planter, a seed receptacle, a seed-dispensing device positioned to pass through the receptacle and to pass therefrom to seed-discharging position, said device having a suction chamber and ducts leading therefrom through the periphery of the device, valves controlling the ducts, said valves being normally open, a stationary cam member in the suction chamber engageable by the valves for closing the same when the ducts arrive at seed-discharging position, and means for exhausting air from the suction chamber.

28. In a planter, a seed receptacle, a seed-dispensing device positioned to pass through the receptacle and to pass therefrom to seed-discharging position, said device having a suction chamber and ducts leading therefrom through the periphery of the device, valves controlling the ducts, said valves being normally open, a stationary cam member in the suction chamber, stems on the valves intercepted by the cam member for closing the valves when the ducts arrive at seed-discharging position, and means for exhausting air from the suction chamber.

29. In a planter, a seed receptacle, a seed-dispensing device positioned to pass through the receptacle and to pass therefrom to seed-discharging position, said device having a suction chamber and ducts leading therefrom through the periphery of the device, valves controlling the ducts, said valves being normally open, a stationary cam member in the suction chamber, stems on the valves intercepted by the cam member for closing the valves when the ducts arrive at seed discharging position, said stems having a resilient cam engaging part, and means for exhausting air from the suction member.

30. In a planter, a hollow rotatable shaft, a seed dispensing device carried by said shaft and having a suction in communication with the interior of the shaft, end closures for the hollow shaft, a stationary shaft passing through the hollow shaft and having a duct opening thereinto, means for exhausting air from the duct, the aforesaid dispensing device having suction ducts leading from its suction chamber through its periphery, valves controlling the last mentioned ducts, said valves being normally open, and means for closing the valves.

31. In a planter, a hollow rotatable shaft, a seed dispensing device carried by said shaft and having a suction in communication with the interior of the shaft, end closures for the hollow shaft, a stationary shaft passing through the hollow shaft and having a duct opening thereinto, means for exhausting air from the duct, the aforesaid dispensing device having suction ducts leading from its suction chamber through its periphery, valves controlling the last mentioned ducts, said valves being normally open, and a cam on the stationary shaft engageable by the valves for closing the same.

32. In a planter, a hollow rotatable shaft, a seed dispensing device carried by said shaft and having a suction in communication with the interior of the shaft, end closures for the hollow shaft, a stationary shaft passing through the hollow shaft and having a duct opening thereinto, means for exhausting air from the duct, the aforesaid dispensing device having suction ducts leading from its suction chamber through its periphery, valves controlling the last mentioned ducts, said valves being normally open, a cam member on the stationary shaft, and stems on the valves intercepted by the cam for closing the valves.

33. In a planter, a hollow rotatable shaft, a seed dispensing device carried by said shaft and having a suction in communication with the interior of the shaft, end closures for the hollow shaft, a stationary shaft passing through the hollow shaft and having a duct opening hereinto, means for exhausting air from the duct, the aforesaid dispensing device having suction ducts leading from its suction chamber through its periphery, valves controlling the last mentioned ducts, said valves being normally open, a cam on the stationary shaft, and stems on the valve intercepted by the cam for closing the valves, said valve stems having a resilient cam-engaging part.

In testimony whereof I affix my signature.

MARIE SLATHAR,
*Executrix of the estate of Fritz Slathar, deceased.*